(12) United States Patent
Murray et al.

(10) Patent No.: US 7,477,654 B2
(45) Date of Patent: Jan. 13, 2009

(54) METHOD AND SYSTEM FOR MANAGING ACCESS TO MULTICAST GROUPS

(75) Inventors: Christopher Warren Murray, Ottawa (CA); Joel Reginald Calippe, Gatineau (CA); Attaullah Zabihi, Kanata (CA); Chuong Ngoc Ngo, Ottawa (CA)

(73) Assignee: Alcatel Lucent, Paris (FR)

( * ) Notice: Subject to any disclaimer, the term of this patent is extended or adjusted under 35 U.S.C. 154(b) by 622 days.

(21) Appl. No.: 11/105,822

(22) Filed: Apr. 14, 2005

(65) Prior Publication Data

US 2006/0233171 A1    Oct. 19, 2006

(51) Int. Cl.
*H04J 3/26* (2006.01)

(52) U.S. Cl. .................. 370/432; 370/390; 370/400; 370/401

(58) Field of Classification Search .................. None
See application file for complete search history.

(56) References Cited

U.S. PATENT DOCUMENTS

| 6,839,348 B2 * | 1/2005 | Tang et al. ............. 370/390 |
| 2002/0106985 A1 * | 8/2002 | Sato et al. ............. 455/3.01 |
| 2004/0100983 A1 * | 5/2004 | Suzuki ............. 370/432 |

FOREIGN PATENT DOCUMENTS

| WO | WO 99/31871 | 6/1999 |
| WO | WO 01/05158 | 1/2001 |

OTHER PUBLICATIONS

Handley, M. et al., "Session Announcement Protocol", Network Working Group, RFC 2974, Oct. 2000, pp. 1-18.
M. Christensen et al., "Considerations for IGMP and MLD Snooping Switches. <draft-ietf-magma-snoop-12.txt>", Network Working Group, Internet Draft, Feb. 2005, The Internet Society (2005).
S. Deering, "Host Extensions for IP Multicasting," rfc1112, Network Working Group, Request for Comments: 1112, Aug. 1989, Stanford University.
B. Cain et al., "Internet Group Management Protocol, Version 3 (Category: Standards Track)," rfc3376, Network Working Group, Oct. 2002, The Internet Society (2002).
A. Adams et al., "Protocol Independent Multicast—Dense Mode (PIM-DM): Protocol Specification (Revised)," rfc3973, Jan. 2005, Network Working Group, The Internet Society (2005).

* cited by examiner

*Primary Examiner*—Duc C Ho (57) ABSTRACT

A method and system for managing the distribution of multicast content are provided. The method involves creating a list of multicast group addresses to be made available to user units supported by a group of nodes. The list is distributed to all of the nodes in the group of nodes. Filters are created to limit the multicast content that each user unit can receive. The filters are created by referencing the list of multicast addresses previously created. The filters are distributed to the appropriate nodes and applied on customer ports.

19 Claims, 5 Drawing Sheets

METHOD AND SYSTEM FOR MANAGING ACCESS TO MULTICAST GROUPS

FIELD OF THE INVENTION

This invention relates to a method and system for configuring nodes in a group of nodes for relaying multicast content to user units.

BACKGROUND

BTV (Broadcast Television) is used to distribute television channels to subscribers using IP (Internet Protocol) multicasting. Each channel is assigned an IP multicast group address. Nodes in a group of nodes subscribe to IP multicast groups assigned to channels to be received by the group of nodes. IGMP (Internet Group Management Protocol) filters in the nodes are applied to customer ports to limit which channels are available to a given location or to a given subscriber. When a subscriber selects a particular TV channel, a request to receive that channel is sent from the subscriber's set top box to a network node responsible for that subscriber. If, for example, the subscriber has paid for a package that includes the selected channel, the IGMP filter will allow the selected channel to be transmitted from the node to the subscriber's set top box.

Presently, each node must be individually configured for all of the IP multicast group addresses and filters. The same set of IP multicast addresses must be entered many times. They must be entered on each node and again for each filter. This is time consuming and error-prone. It is done either directly on each node or using an element manager. An element manager is a software interface that provides a GUI (graphical user interface) for interacting with the node. Each node must still be configured individually.

For example, to set up TV channels, an operator must define the set of TV channels and associate them with multicast groups, such as Class D IP Addresses. An example of how this is done involves an operator typing in addresses as follows:

CBC→230.1.1.1;
CTV→230.1.1.2;
A&E→230.1.1.3;
TSN→230.1.1.4; and
DISC→230.1.1.5.

Next, the operator must configure the appropriate nodes to receive content on the multicast group addresses. This must be done individually for all nodes in a group of nodes, such as a ring of nodes. For the examplary channels given above, the following configuration steps must be performed for each node in the group:

add multicast group 230.1.1.1;
add multicast group 230.1.1.2;
add multicast group 230.1.1.3;
add multicast group 230.1.1.4; and
add multicast group 230.1.1.5.

For any logical packages of channels (Basic, Premium, etc), the operator must configure an IGMP filter on each node, individually. For example the operator may perform the following steps to set up Basic and Premium packages:

Set up for Basic:
Basic (CBC, CTV); assign filter ID 800;
IGMP filter 800 permit 230.1.1.1;
IGMP filter 800 permit 230.1.1.2;
IGMP filter 800 Deny All Others;
Set up for Premium:
Premium (A&E, DISC, TSN); assign the filter ID 801;
IGMP filter 801 permit 230.1.1.3;
IGMP filter 801 permit 230.1.1.4;
IGMP filter 801 permit 230.1.1.5;
IGMP filter 801 deny all others;
Set up for Basic and Premium:
Basic And Premium; assign the filter ID 802;
IGMP filter 802 permit 230.1.1.1;
IGMP filter 802 permit 230.1.1.2;
IGMP filter 802 permit 230.1.1.3;
IGMP filter 802 permit 230.1.1.4;
IGMP filter 802 permit 230.1.1.5;
IGMP filter 802 deny All Others.

When adding a new subscriber or modifying a subscriber, the operator must assign an IGMP filter for each customer at an appropriate node. For example if customer A wants Basic (where ID 800 is Basic), the operator must configure the appropriate node as follows:

use IGMP filter 800 on port 1/1/1.

If the customer wants customized TV channels (CBC, A&E), the operator must create a special IGMP filter and configure the node as follows:

IGMP filter 850 permit 230.1.1.1;
IGMP filter 850 permit 230.1.1.3;
IGMP filter 850 deny all others; and
Use IGMP filter 850 on port 1/1/1.

As can be seen from the above, configuring a group of nodes involves typing in multicast addresses many times, i.e. for each node to be configured. This is very susceptible to errors. Each node must be configured individually to receive the multicast addresses and filters must be individually created for each user port.

SUMMARY OF THE INVENTION

In a first aspect of the present invention, there is provided a method of configuring a plurality of nodes to receive multicast content from a plurality of multicast addresses, such that each node is capable of relaying multicast content, said method comprising: identifying a group of nodes to be configured; storing a list of multicast group addresses to be made available to each node in the group of nodes; distributing all of the multicast group addresses from the list to each node in the group of nodes; and enabling each node to receive multicast content from each of the multicast group addresses in the list distributed to each node in the group of nodes.

This aspect has the advantage of uniformly configuring all of the nodes in a group using a pre-created list of multicast group addresses so that all nodes in the group are configured to receive multicast content from the same multicast group addresses. As the same list of multicast group addresses is used to configure the nodes, it is not necessary to retype the addresses for each node to be configured and thereby the risk of errors is reduced. For example, the list may be stored in such a way (e.g. in a machine readable medium) that the stored multicast addresses can be accessed and machine read from storage and transmitted by machine from storage to each node, obviating the need to repeatedly type in each multicast address.

The first aspect may further comprise the steps of upon receipt of a request that at least one user unit receive specific multicast content, creating a filter to limit multicast group addresses that can be accessed by the at least one user unit to multicast group addresses carrying the specific multicast content, said multicast group addresses carrying the specific content being in the list of multicast group addresses distributed to the nodes in the group of nodes; and distributing the filter to at least one node to implement the filter at a port used to interface with the at least one user unit.

Therefore, filters can be created and distributed to nodes without the need for retyping each address to be filtered.

In a second aspect, there is provided a method of configuring a plurality of nodes to receive multicast content from one or more multicast addresses, such that each node is capable of relaying multicast content, the method comprising: recording on a machine readable medium a list of data representing each multicast address to be transmitted to a node, supplying stored data from the list to communication signal generation and transmission means, transmitting from the communication signal generating and transmission means data based on the supplied data to a plurality of said nodes, and enabling said plurality of nodes to receive multicast content from each multicast address, whose representative data is transmitted from said communication signal generation and transmission means to said plurality of nodes.

Therefore, any node can be configured by referring to a recorded list and using the stored data rather than retyping addresses. The machine readable medium may comprise any medium that allows data to be accessed and transmitted therefrom by machine, including but not limited to electronic, magnetic and/or optical media. The supplying of stored data from the stored list to the communication signal generation and transmission means can thereby by machine implemented, so that no retyping of multicast addresses is required.

In a third aspect, there is provided a method of creating a filter for limiting data transmission from a port of a node to a user unit connected to the port, the method comprising identifying a set of data representing one or more multicast addresses, said set of data being stored in data storage means, and electronically importing said data from said data storage means into said filter.

Advantageously, a filter can be created by referring to stored data and using the stored data to create the filter.

In a fourth aspect, there is provided a system for configuring a plurality of nodes to receive multicast content from a plurality of multicast addresses such that each node is capable of relaying multicast content to one or more user units, the system comprising: storage means storing a list of nodes in a predetermined group of nodes and storing a predefined list of multicast group addresses to be made available to each node in the predetermined group, and signal generation means for generating one or more communication signals containing multicast group addresses from the list, the communication signals addressed to each node in the predetermined group such that all multicast addresses in the list are transmitted to each node in the group.

In another aspect, there is provided a system for configuring a plurality of nodes to receive multicast content from a plurality of multicast addresses such that each node is capable of relaying multicast content to one or more user units, the system comprising: filter processing means for creating a filter to limit multicast group addresses that can be accessed by at least one user unit to specific multicast group, said specific multicast group addresses being selected from a predefined list of multicast group addresses; and signal generation means for generating one or more communication signals to at least one node servicing the at least one user unit such that the filter is distributed to the at least one node.

In another aspect, there is provided a method of creating a filter for limiting data transmission from a port of a node to a user unit connected to the port, the method comprising identifying an electronic record of data representing all multicast addresses whose content the node is configured to receive, creating an electronically recorded subset of data representing a subset of one or more multicast addresses by selecting recorded data for the subset from the electronic record, electronically importing said recorded data into said subset, and creating said filter from said electronically recorded subset.

Embodiments of the present invention manage the configuration of nodes for the distribution of multicast content to user units. A node group to which the multicast content is to be sent is identified. An operator may create a list of multicast group addresses, representing all of the multicast group addresses to be made available to a node group. The operator assigns the list of multicast group addresses to the node group. A network management system stores the list of multicast group addresses. The list of multicast addresses is distributed to nodes in the group of nodes.

In some embodiments, for each user unit supported by the group of nodes, the network management system creates a filter for limiting the multicast group content which the user unit is permitted to receive. The network management system distributes the filters to the appropriate nodes to be implemented on user ports. In some embodiments the creation and distribution of the filter is done without human intervention.

Other aspects and features of the present invention will become apparent, to those ordinarily skilled in the art, upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

In embodiments of the present invention, a network management system configures nodes used in the distribution of multicast content. The network management system communicates with the nodes through a communication network to which the nodes are connected either directly or indirectly. In some embodiments the multicast content is IP multicast content and the communication network is an IP network.

Figure 1:
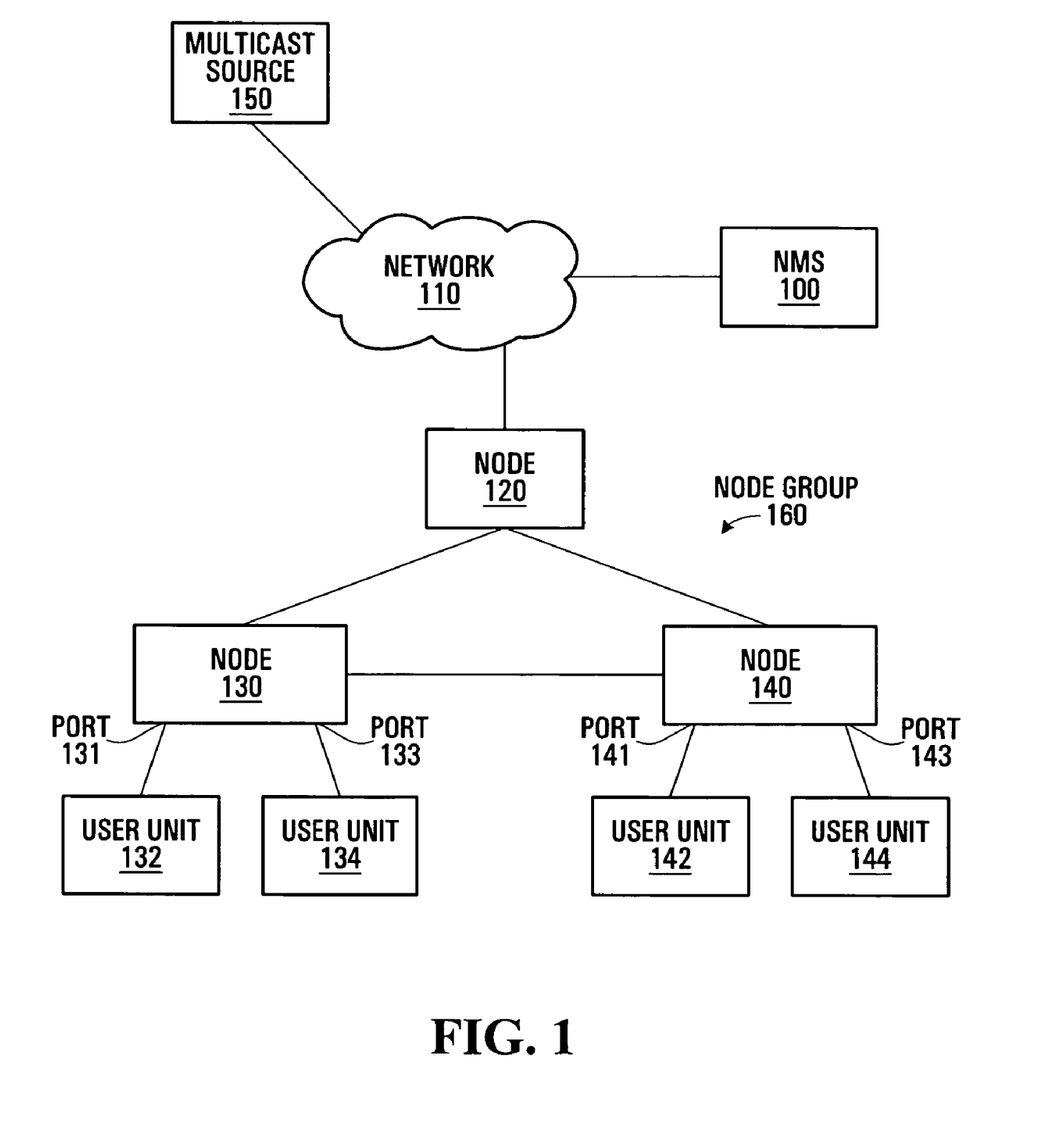
FIG. 1 is a schematic diagram of a system comprising a network management system according to an embodiment of the present invention.

FIG. 1 is a schematic diagram showing a system which includes an embodiment of the network management system. The network management system 100 is connected to a communication network 110. Preferably, the communication network 110 is multicast capable. Also connected to the communication network is a multicast source 150. A plurality of nodes 120, 130 and 140 make up a group of nodes 160 to which multicast content is directed. The group of nodes 160 is connected to the communication network. In the example of FIG. 1, the nodes are in a ring formation. Node 120 is connected to the communication network 110 and to the other two nodes 130, 140. Nodes 130 and 140 are connected to each other and to node 120. Node 130 has two user units 132, 134 connected to it through user ports 131, 133 respectively. Node 140 has two user units 142, 144 connected to it through user ports 141, 143 respectively.

FIG. 1 depicts a specific system with which the network management system can be used. It is understood that the network management system can be used with any configuration of communication system. For example, in FIG. 1, the nodes are in a ring formation. Any formation may be used. For example, in some embodiments, a tree formation exists. The FIG. 1 example has three nodes. In other embodiments, any number of nodes is possible in the system. The FIG. 1 example has only one group of nodes. In other embodiments, the network management system may manage any number of groups of nodes. Nodes 130 and 140 in the FIG. 1 example each have two user units connected to them. In other embodiments, any node may have any number of user units connected to it. As well, a user unit may be connected to more than one node. The system of FIG. 1 has only one multicast source. In other embodiments, any number of multicast sources are connected to the network and are supported by the network management system. The system of FIG. 1 also only has one communication network 110. In other embodiments, any number of communication networks can be interconnected.

In some embodiments the network management system is implemented using software. Some embodiments of the network management system are located on a computer terminal. It is understood that the network management system can comprise any combination of hardware and/or software and can be located in more than one physical location.

In one embodiment, the multicast source is a video source sending out TV channel content to IP multicast group addresses. However, the multicast content may be any other multicast media, including but not limited to: audio-video, such as a private conference; audio/music such as radio broadcasts; media feeds such as text or web page streaming to a TV screen providing, for example news, stock feeds, and/or other information; still pictures; or combinations of any of the above and/or others.

Examples of nodes are routers, such as the Alcatel 7450 ESS or any Layer 3 IP router, and Layer 2 switches such as the Telco T5C. Examples of user units are television sets, computer terminals, and video conferencing equipment. In a preferred embodiment, a user unit comprises a television set and a set top box. In some embodiments the user units are connected to an IP network through PE (Provider Edge) devices such as DSLAMs (Digital Subscriber Line Access Multiplexers) or MTUs (Multi-tenant units). Some embodiments of the present application may be implemented using wireless connections. In operation, the network management system 100 creates a list of multicast group addresses comprising all of the multicast group addresses available to the group of nodes 160. This list can be called a master list or a root catalogue. In some embodiments, the network management system 100 also creates filter configurations for personal packages of multicast group addresses to which the user units can subscribe. A personal package comprises a group of multicast group addresses selected from the list of multicast group addresses. The network management system 100 distributes the filter configurations to the appropriate nodes for implementation on the appropriate user ports. For example, if user unit 132 subscribes to package A, then the filter configuration for package A is sent to node 130 to be implemented on port 133. In some embodiments the filter is an IGMP filter.

In one embodiment, an operator enters a set S of multicast channels available for the group of nodes 160 into a root catalogue package R. The root catalogue package R is not necessarily exclusive to group of nodes 160 and may be used in other node groups. The operator then assigns root catalogue R to group of nodes 160. The network management system 100 then, without further human intervention, distributes the set S of multicast channels defined in root catalogue R to all nodes in the group of nodes 160. This makes the multicast channel streams defined in root catalogue R available to all nodes in the group of nodes 160.

From root catalogue R and set S of multicast channels, the network management system operator may define subsets of multicast channels $S_1, S_2, \ldots, S_n$ that define either general or personal packages, wherein a general package is a common set of channels available to many end users, and a personal package is a set of channels available to a single end user. The selection of multicast channels to be included in the subset $S_i$ (where i=1 ... n) is done by selecting the multicast channels from S (ie. there is no need to re-enter the multicast channel data). The subsets $S_i$ do not need to be distributed to the nodes in group of nodes 160 but are used to aid in the creation of filters for specific end users. The network management system operator selects a package that contains the end user's desired subset of channels and the network management system creates a filter from it (ie. there is no need to reenter the multicast address data). This filter is then distributed by the network management system to the node on which the end user's port resides, and the filter is then assigned to the end user port, thereby allowing only the desired channels to be selected from that end-user's set-top box.

In some embodiments, the filters are distributed to the nodes on an as needed basis. That is, when a user subscribes to a package, the filter for that package is distributed to the appropriate node by the network management system and assigned to the user port for that user. In other embodiments, filters for the general packages are distributed to all of the nodes and are assigned to the user ports on an as needed basis. In this case, the nodes have all of the filters for the general packages and when a user subscribes to a package, the network management system assigns the appropriate filter to the user port for that user.

In various embodiments, the operator may be a human user or a provider's Operational Support System (OSS) communicating to the NMS, or any other piece of software. For example the operator could be tied to a web application or a telephone application available directly to the end user. In those cases, it may be possible for the end user to subscribe to packages, to view details of his or her account, or to modify his or her subscription.

At some point, a human defines the multicast channels available in the node group. In one embodiment this is an operator at the provider. The end users will ultimately define which subset of channels they wish to receive. In some embodiments this may be done via calling and talking to a provider employee, using a web-application, or an automated phone system.

In some embodiments, an interface, such as a GUI, is presented to an operator, that allows the operator to select from and/or manipulate the information presented. The operator can create a subset of the list of multicast group addresses by selecting from the stored list. Some embodiments also allow the operator to assign an identifier to a subset, so that a subset may be selected using its identifier. In some embodiments the selection of multicast addresses and identifiers is performed using a computer mouse. In other embodiments a keyboard may be used. Any form of selection that obviates the need to retype the addresses may be used.

In other embodiments an interface is presented to the operator that allows the user to create a list of node or node addresses. In some embodiments, this interface also allows the operator to assign an identifier to a group of nodes from the list of nodes by selecting the nodes that make up the group from the previously created list. In other embodiments, the operator can select a group of nodes by selecting the identifier. The selection may be performed using a mouse, a keyboard or any machine obviating the need to retype the node addresses.

Once the filters are configured on the user ports at the nodes, the user units 132, 134, 142, and 144 send requests to receive specific multicast content. For example, in BTV, if a subscriber selects a TV channel, the subscriber's set top box sends a request to the node responsible for the set top box to receive the content for that TV channel. If a request from a particular user unit is for content on a multicast address which the user unit is entitled to receive, the filter on the respective user port will allow the multicast content of that particular multicast group address to go to the user unit.

In some embodiments, the network management system stores one or more properties or descriptors associated with each multicast group address. The properties can be, but are not limited to channel name, channel number, price, description or combinations thereof. In some embodiments, the properties are presented in a GUI to an operator. In other embodiments, a subscriber can access the properties associated with multicast addresses that are available to him or her.

The stored properties make it possible to present a subscriber with a user friendly interface of information about his or her account or future account. For example, in some embodiments, a subscriber can access a table stored by the network management system showing all of the TV channels to which he or she subscribes. In some embodiments, a price associated with each channel is also provided. The multicast group address associated with each channel is not necessarily presented in the table. In still other embodiments, the subscriber can modify the channels to which he or she subscribes while accessing the network management system. In some embodiments, a subscriber can access the network management system through a web portal. In other embodiments, the subscriber can access the network management system by an automated telephone system.

The stored properties also make it possible to present a user friendly interface to the operator. Once the list of multicast addresses is created, the operator can assign properties to each address. Then, to create subsets, the operator can choose from the list. The list presented to the operator for the creation of subsets, may be a list of one or more of the properties, such as the channel names, rather than the multicast group addresses. The multicast group addresses are not necessarily presented to the operator subsequent to the initial creation of the list of multicast group addresses.

In embodiments where each multicast group address represents a television channel, a local package may comprise a group of channels. The filter for that local package is configured to either only allow those channels to go to the user unit or to exclude all other channels. Local packages can be preset groups of channels, for example a basic package of a set of standard channels that every subscriber receives, a sports package of sports channels or a news package of news channels. Local packages can also be user unit specific, where a user chooses the channels to which he or she subscribes.

Figure 2A:
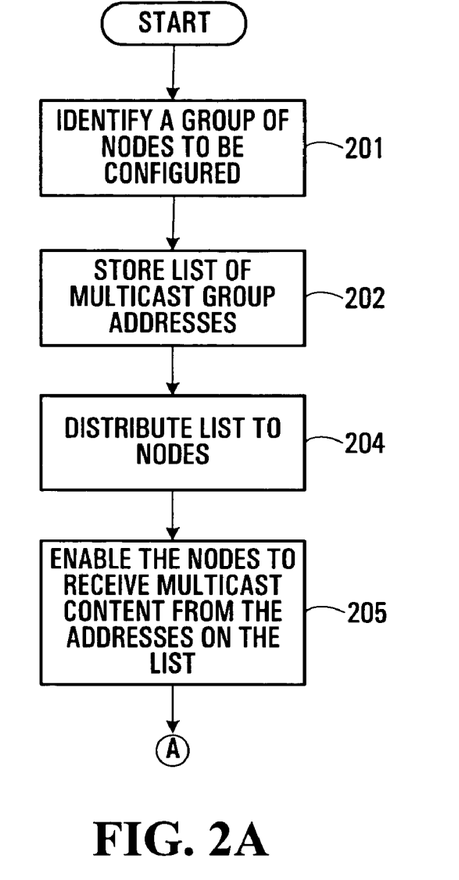
FIG. 2a is a flowchart of a method according to an embodiment of the present invention.

FIG. 2a is a flowchart of a method of an embodiment of the invention. First, a group of nodes to be configured is identified (Step 201). Then, a list of multicast group addresses of all the multicast group addresses available to a group of nodes is stored (Step 202). The list of multicast group addresses is created by an operator. Then, the multicast group addresses on the list are distributed to each node in the group of nodes (Step 204). Next, each node is enabled to receive multicast content from each multicast group address on the list (Step 205). In some embodiments, the list of multicast group addresses is distributed by unicast over an IP network.

Figure 2B:
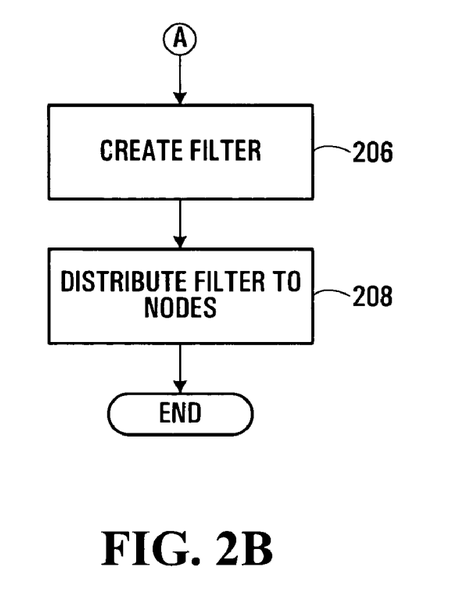
FIG. 2b is a flowchart of another method according an embodiment of the present invention

FIG. 2b is another method according to another embodiment of the invention. It shows the creation of a filter for a subset of the list of multicast group addresses created in the method described with reference to FIG. 2a. Starting at point 'A' in FIG. 2a, filter configurations for local packages of multicast group addresses are created (Step 206). Detailed examples of the creation of filters are provided below. Finally, the filter configurations are distributed to the nodes in the group of nodes for implementation on user ports (Step 208).

Figure 3:
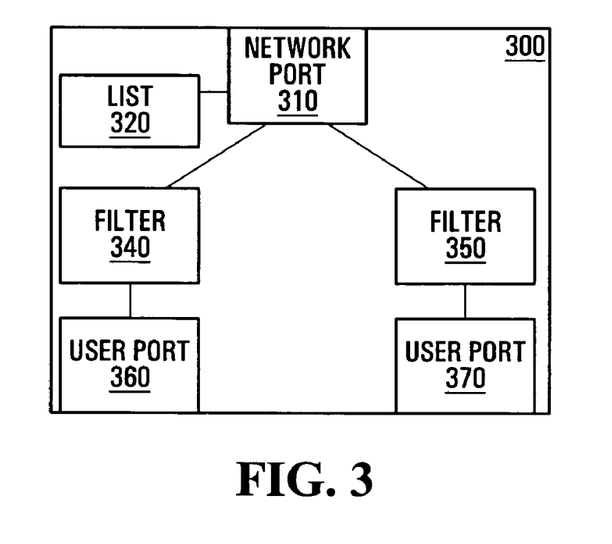
FIG. 3 is a block diagram of a node configured according to an embodiment of a method of the present invention.

FIG. 3 is a block diagram of a node configured by an embodiment of the invention. Node 300 has a network port 310, which is operably connectable to a communication network such as an IP network or an Ethernet. Although the FIG. 3 example has only one network port, other embodiments may have more than one network port. Node 300 also has two user ports 360 and 370 which are operably connectable to user units. Although the FIG. 3 example has two user ports, other embodiments of the node may have any number of user ports. Between each user port 360 and 370 and the network port 310 is a respective filter 340 and 350. The filter configurations are created by a network management system and distributed to the node via the communications network. The node 300 also comprises a list of multicast group addresses 320 which is created at the network management system and distributed by the network management system to the node via the communications network. The list of multicast group addresses 320 can be accessed by the network port 310 to determine the multicast group addresses from which the node is entitled to receive multicast content.

In various embodiments of the invention, node 300 can be a router, such as the Alcatel 7450 ESS or any Layer 3 IP router, or a Layer 2 switch such as the Telco T5CLayer. The components of the node 300 can be any combination of hardware and/or software capable of performing the functions disclosed. In some embodiments the filters 340 and 350 are IGMP filters.

Figure 4:
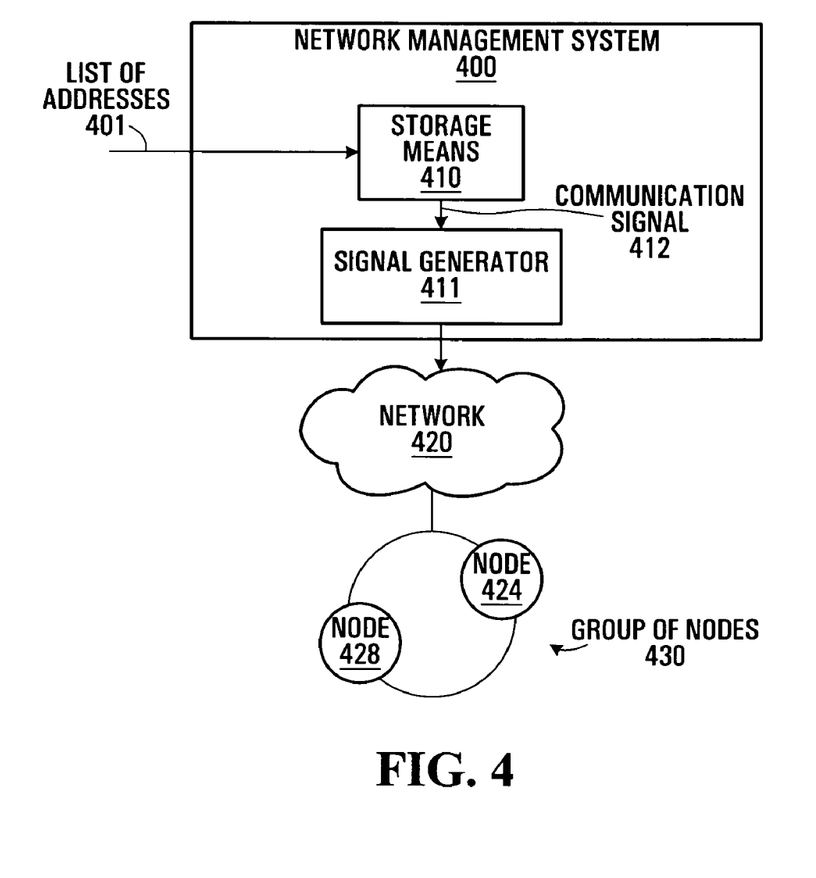
FIG. 4 is a functional block diagram of a network management system according to an embodiment of the invention.

FIG. 4 is a functional block diagram of a network management system according to an embodiment of the invention. The network management system comprises a storage means 410 for storing a list of multicast group addresses 412 to be distributed to configure nodes 424, 428 in a group of nodes 430. The network management system also comprises a signal generator 411 that generates and transmits one or more communication signals containing multicast group addresses from the list of multicast group addresses, through a communication network 420, such that the multicast group addresses 412 on the list are distributed to all of the nodes 424, 428 in the group of nodes 430.

Figure 5:
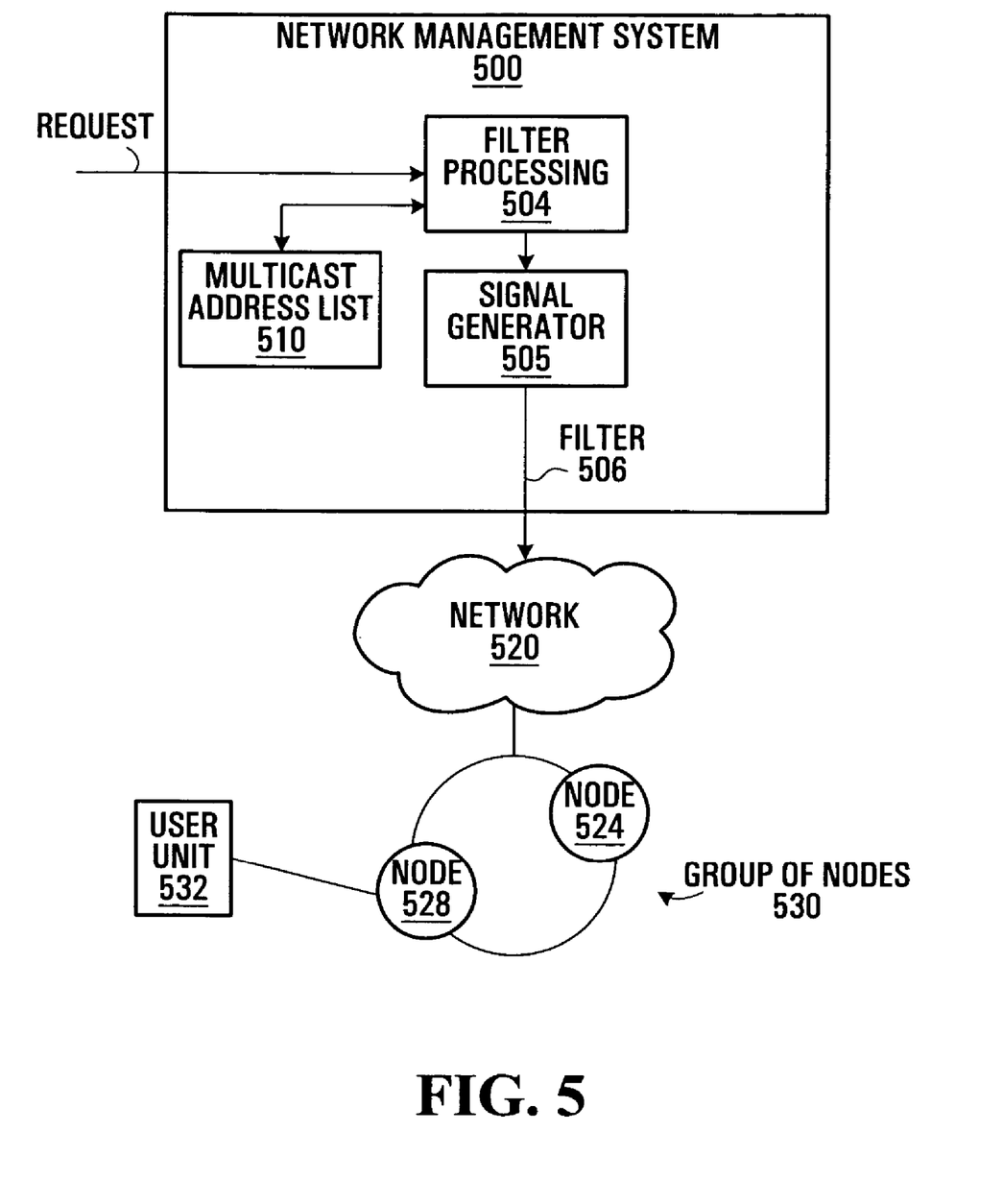
FIG. 5 is a functional block diagram of a network management system according to an embodiment of the invention.

FIG. 5 is a functional block diagram of a network management system according to another embodiment of the invention. The network management system comprises a multicast address list 510, which has been created previously. The network management system also comprises a filter processing means 504. Upon receipt of a request that a user unit 532 receive specific multicast content, the filter processing means 504 creates a filter 506 to limit the multicast group addresses that can be accessed by the user unit to multicast group addresses carrying the specific multicast content. In some embodiments, the filter can also limit the multicast source from which the user unit can receive multicast content. The multicast group addresses carrying the specific multicast content are selected from the list of multicast group addresses stored in the storage means 510 and which has been previously distributed to all of the nodes 524, 528 in the group of nodes 530. The network management system also comprises a signal generator 505, which generates one or more communication signals for distributing the filter 506 to the node 528 to implement the filter at a port used to interface with the user unit 532.

It is possible for the network management system to receive a request for a subscriber to receive multicast content from a multicast group address that is not on the stored list of multicast group address. In some embodiments, the stored list of multicast group addresses can be modified to include the new multicast group address and redistributed to the nodes. A filter may be created for the subscriber to permit the access to the new multicast group address. The filter may be distributed to the appropriate node to be applied to the user port for the subscriber's user unit. In other embodiments, the request is refused if the multicast group address is not on the list.

In some embodiments, the storage means described with reference to FIG. 4 and the filter processing means described with reference to FIG. 5 are both within one network management system.

In some embodiments the network management system includes a graphical user interface, so that an operator can input instructions into the network management system. Examples of instructions that an embodiment of the network management system may receive are:

Set up neighbourhood A to receive all of the television channels in the Premium Package;

Create a filter so that John Smith in neighbourhood A receives Basic Package; and Create a filter so that Jane Doe in neighbourhood A receives channels 1 and 10.

Other embodiments of the network management system store a table of one or more properties associated with each multicast group address. Examples of the properties that can be stored in the table are: channel name, channel number, channel description and price.

Figure 6:
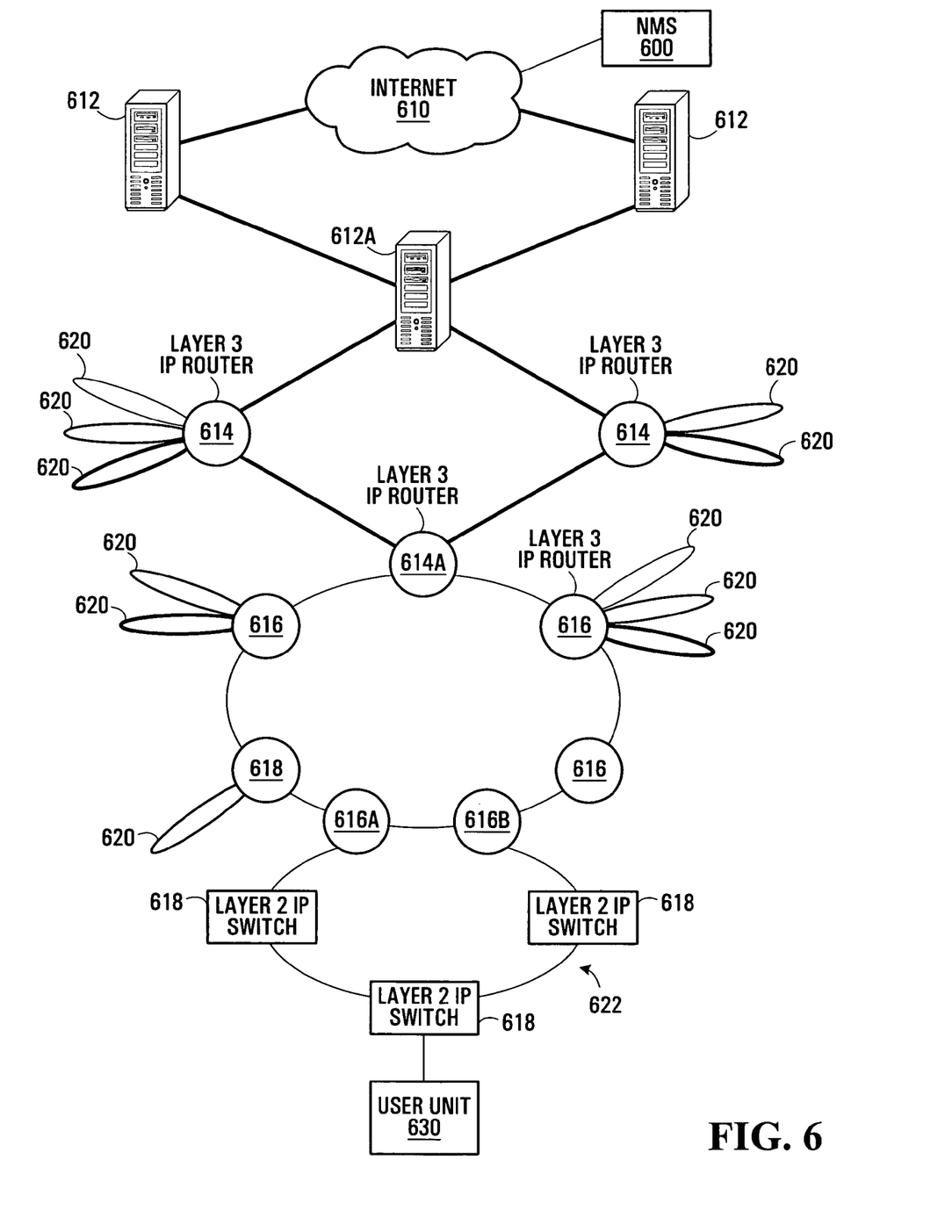
FIG. 6 is a block diagram of a system according to an embodiment of the present invention.

FIG. 6 is a block diagram of a specific example of a system according to an embodiment of the present invention. The system comprises a network management system 600 and a plurality of routers 612 in communication with the Internet 610. One of those routers 612A is in communication with a ring of a plurality of Layer 3 IP routers. It is understood that each of the routers 612 may service any number of Layer 3 IP routers. One Layer 3 IP router 614A is in communication with a ring of a plurality of other Layer 3 IP routers 616. In some embodiments, the Layer 3 IP routers 616 are the same type as the Layer 3 IP routers 614. Two of the Layer 3 IP routers 616A, 616B form a ring 622 with a plurality of Layer 2 IP switches 618. One of the Layer 2 switches 618 is in communication with a user unit 630. It is understood that each Layer 2 IP switch can service any number of user units. Throughout the system shown in FIG. 6, Layer 3 IP routers 614, 616 are shown connected to one or more loops 620. These loops 620 each represent a ring of nodes, such as the ring 622 described above.

With reference to FIG. 6, Layer 3 IP routers 614, 616 and Layer 2 IP switches 618 are examples of nodes. A group of nodes may be a ring 620, 622 of Layer 2 IP switches or all of the Layer 3 routers 616 serviced by a particular Layer 3 IP routers 612 or all of the Layer 3 IP routers 614 serviced by a router 612. In some embodiments, a group of nodes is made up of Layer 2 IP switches, such as Telco's T5C. The network management system 600 performs functions similar to network management systems described above with reference FIGS. 1 to 5, such as distributing lists of multicast group addresses or route catalogues to the nodes of groups of nodes, creating IGMP filters according to user unit requirements and distributing the IGMP filters to the nodes in the groups of nodes.

As can be seen from FIG. 6, embodiments of the present invention can comprise a complex system of nodes. The advantages mentioned above become more apparent as the system becomes more complex. A more complex system is more prone to errors if the conventional methods are used because the multicast addresses must be typed in numerous times. Regardless of the complexity of the system, according to embodiments of the present invention, the multicast group addresses need only be typed in when the list of multicast group addresses is created or modified.

Embodiments of the network management system of the present invention implement instructions from an operator using the methods described earlier. An example of how a network management system can configure a neighbourhood, where the neighbourhood is made up of a group of nodes is described below.

The operator defines multicast group addresses for a master list of television stations to be made available to the neighbourhood. For example:

CBC→230.1.1.1, price, description, etc

CTV→230.1.1.2, price, description, etc

A&E→230.1.1.3, price, description, etc

TSN→230.1.1.4, price, description, etc

DISC→230.1.1.5, price, description, etc

The list may include one or more descriptors or properties, such as price, channel name, channel number, channel description. The Class D multicast addresses are only entered once at the creation of the list of multicast group addresses.

The network management system then creates a list of multicast group addresses to be made available to the particular neighbourhood. The list of multicast group addresses is assigned to one or more groups of nodes and automatically distributed to all the nodes to which it is assigned.

An operator can select a subset of the channels from the master list to define a logical package of channels (Basic, Premium, etc). The network management system automatically generates the IGMP filter necessary to implement the logical package. The IGMP filters are then distributed to the appropriate nodes.

If the network management system receives a request from an operator or directly from a customer to receive the Basic package, the network management system assigns that customer to the basic package. The filter for the basic package would have already been created. Therefore, the only step required is to distribute the filter to the appropriate node to implement on the customer port. This may be done automatically.

If a customer wants customized TV channels (CBC, A&E), the network management system selects the desired channels from the master list to create a personal package. A personalized filter is automatically generated using multicast group addresses selected from the list of multicast addresses previously created and distributed to the nodes. The personalized filter is then distributed to the node responsible for the customer to implement on the customer port.

If a customer wants to subscribe to more than one package, some embodiments of the network management system create a filter using the subsets of channels for each package. Other embodiments, the network management system unionizes the filters already created for the packages to create a new filter. In still other embodiments, the network management system selects the channels for the packages from the master list to create a personal package and then creates a personal filter, as discussed above.

As can be seen embodiments of the present invention provide efficient and relatively error-free means of implementing broadcast television or conferencing over an IP network.

What has been described is merely illustrative of the application of the principles of the invention. Other arrangements and methods can be implemented by those skilled in the art without departing from the spirit and scope of the present invention.

The invention claimed is:

1. A method of configuring a plurality of nodes to receive multicast content from a plurality of multicast addresses, such that each node is capable of relaying multicast content, said method comprising:
   identifying a group of nodes to be configured;
   storing a list of multicast group addresses to be made available to each node in the group of nodes;
   distributing all of the multicast group addresses from the list to each node in the group of nodes; and
   enabling each node to receive multicast content from each of the multicast group addresses in the list distributed to each node in the group of nodes.

2. The method of claim 1, further comprising:
   upon receipt of a request that at least one user unit receive specific multicast content, creating a filter to limit multicast group addresses that can be accessed by the at least one user unit to multicast group addresses carrying the specific multicast content, said multicast group addresses carrying the specific content being in the list of multicast group addresses distributed to the nodes in the group of nodes; and
      distributing the filter to at least one node to implement the filter at a port used to interface with the at least one user unit.

3. The method of claim 1, further comprising creating a table of multicast group addresses and one or more property associated with each multicast group address in the list of multicast group addresses, said one or more property being selected from the group consisting of: channel name, channel number, channel description, and price associated with receiving the channel.

4. A method as claimed in claim 1, wherein the distributing comprises machine implemented steps of supplying a record of each multicast group address from the stored list to a signal generating means and distributing the multicast group addresses from the signal generating means.

5. A method as claimed in claim 1, further comprising creating a subset of multicast group addresses from the stored list, by selecting each multicast group address to be included in the subset from the stored list and electronically supplying a record of each selected multicast address to the subset.

6. A method of configuring a plurality of nodes to receive multicast content from one or more multicast addresses, such that each node is capable of relaying multicast content, the method comprising:
   recording on a machine readable medium a list of data representing each multicast address to be transmitted to a node,
   supplying stored data from the list to communication signal generation and transmission means,
   transmitting from the communication signal generation and transmission means data based on the supplied data to a plurality of said nodes, and enabling said plurality of nodes to receive multicast content from each multicast address, whose representative data is transmitted from said communication signal generation and transmission means to said plurality of nodes.

7. A method as claimed in claim 6, wherein said transmitting comprises transmitting data representative of the same multicast address from said signal generation and transmission means to said plurality of nodes.

8. A method as claimed in claim 7, wherein said transmitting comprises transmitting data representative of the same plurality of multicast addresses from said communication signal generation and transmission means to said plurality of nodes.

9. A method as claimed in claim 6, wherein the recording comprises recording data representative of a plurality of multicast addresses to be transmitted to each node,
   the supplying comprises supplying the stored data to said communication signal generation and transmission means,
   and the transmitting comprises transmitting data representative of all of said multicast addresses from said communication signal generation and transmission means to said plurality of nodes.

10. A method as claimed in claim 6, further comprising creating a recorded subset of data representative of a subset of multicast addresses from the record of multicast addresses by selecting data representing each multicast address to be included in the subset from the record and importing the record of each selected data representing each multicast address into the subset.

11. A method as claimed in claim 6, further comprising creating a filter to be applied to a port of at least one of said nodes to prevent multicast content from one or more multicast source being transmitted from said port, wherein creating said filter comprises importing data representing one or more multicast address from said list of data representing each multicast address into said filter.

12. A method as claimed in claim 6, wherein said data comprises at least one of said multicast address and information from which said multicast address can be identified.

13. A method as claimed in claim 12, wherein said information comprises at least one of a channel name, a channel number, a cost and a description.

14. A system for configuring a plurality of nodes to receive multicast content from a plurality of multicast addresses such that each node is capable of relaying multicast content to one or more user units, the system comprising:
   storage means storing a list of nodes in a predetermined group of nodes and storing a predefined list of multicast group addresses to be made available to each node in the predetermined group, and signal generation means for generating one or more communication signal, each containing one or more multicast group address from the list, the communication signal addressed to each node in the predetermined group such that all multicast addresses in the list are transmitted to each node in the group.

15. The system of claim 14, further comprising: filter processing means for creating a filter to limit multicast group addresses that can be accessed by at least one user unit to specific multicast group, said specific multicast group addresses being selected from the predefined list of multicast group addresses, said signal generation means also being for generating one or more communication signals to at least one node servicing the at least one user unit such that the filter is distributed to the at least one node.

16. The system of claim 14, wherein said storage means is also for storing a table of multicast group addresses and one or more property associated with each multicast group address in the list of multicast group addresses, the one or more property being selected from the group consisting of: channel name, channel number, channel description, and price associated with receiving the channel.

17. The system of claim 15, wherein the filter also limits multicast sources from which the at least one user unit can receive multicast content.

18. The system of claim 16, further comprising a user interface for enabling a user to view data in the table.

19. The system of claim 14, further comprising a user interface for enabling a user to communicate with the system in order to request access to specific multicast group addresses.

* * * * *